United States Patent
Sharma et al.

(10) Patent No.: US 11,514,145 B2
(45) Date of Patent: Nov. 29, 2022

(54) LINKING INDIVIDUAL BIOMETRIC DATA TO PROTECTED RESOURCES ACCESSED VIA USER DEVICES

(71) Applicant: EMC IP Holding Company LLC, Hopkinton, MA (US)

(72) Inventors: Nagendra Gudibande Srikanta Sharma, Bangalore (IN); Udayendranaidu Gottapu, Visakhapatnam (IN); Pedda Reddy Kathriki, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 227 days.

(21) Appl. No.: 16/876,313

(22) Filed: May 18, 2020

(65) Prior Publication Data
US 2021/0357483 A1 Nov. 18, 2021

(51) Int. Cl.
| | |
|---|---|
| *G06F 21/32* | (2013.01) |
| *G06F 21/44* | (2013.01) |
| *G06V 40/12* | (2022.01) |
| *G06V 40/16* | (2022.01) |
| *G06V 40/18* | (2022.01) |

(52) U.S. Cl.
CPC .............. *G06F 21/32* (2013.01); *G06F 21/44* (2013.01); *G06V 40/12* (2022.01); *G06V 40/168* (2022.01); *G06V 40/197* (2022.01)

(58) Field of Classification Search
CPC ..... G06F 21/32; G06F 21/44; G06K 9/00006; G06K 9/00617; G06K 9/00268
See application file for complete search history.

(56) References Cited

U.S. PATENT DOCUMENTS

| | | | |
|---|---|---|---|
| 10,140,502 B1* | 11/2018 | Shilo | H04L 9/0866 |
| 11,303,631 B1* | 4/2022 | Alexanian | H04L 63/0861 |
| 2007/0255963 A1* | 11/2007 | Pizano | G06F 21/6218 713/189 |
| 2014/0139318 A1* | 5/2014 | Malpani | G06F 21/32 340/5.82 |
| 2014/0354401 A1* | 12/2014 | Soni | G07C 9/37 340/5.52 |

(Continued)

*Primary Examiner* — John B Strege
(74) *Attorney, Agent, or Firm* — Ryan, Mason & Lewis, LLP (57) ABSTRACT

Methods, apparatus, and processor-readable storage media for linking individual biometric data to protected resources accessed via user devices are provided herein. An example computer-implemented method includes obtaining biometric data associated with users of a user device and identifying information pertaining to the biometric data; outputting the identifying information pertaining to the of biometric data and identifying information pertaining to protected resources; linking at least a portion of the multiple sets of biometric data to one of the protected resources based on input from at least a first of the users in response to the outputting step; processing, in response to an authentication request in connection with an attempt to access the protected resource by the at least first user, biometric data input to the user device; and resolving the authentication request in response to a determination that the input biometric data match the biometric data linked to the protected resource.

20 Claims, 7 Drawing Sheets

(56) References Cited

U.S. PATENT DOCUMENTS

| | | | |
|---|---|---|---|
| 2016/0085564 A1* | 3/2016 | Arcese | G06F 9/4451 |
| | | | 726/7 |
| 2017/0124315 A1 | 5/2017 | Klevan et al. | |
| 2018/0203987 A1 | 7/2018 | Klevan et al. | |
| 2018/0239885 A1* | 8/2018 | Kumar | G06F 9/451 |
| 2018/0314817 A1* | 11/2018 | Gadde | G06F 21/604 |
| 2019/0026452 A1* | 1/2019 | Wang | G06F 21/629 |
| 2019/0130412 A1 | 5/2019 | Battle | |
| 2019/0294816 A1 | 9/2019 | Chabanne et al. | |

\* cited by examiner

LINKING INDIVIDUAL BIOMETRIC DATA TO PROTECTED RESOURCES ACCESSED VIA USER DEVICES

FIELD

The field relates generally to information processing systems, and more particularly to techniques for providing security in such systems.

BACKGROUND

Modern user devices often include biometric authentication capabilities. However, utilizing such capabilities commonly creates problems when a given user device is shared among more than one user. In addition, many third-party security service providers and native device applications also rely on end-user device biometrics for authentication, which in the case of a shared device poses security challenges. Some conventional user device authentication approaches include enabling the creation of multiple user profiles on a single device. However, utilizing such approaches commonly results in performance issues for the device.

SUMMARY

Illustrative embodiments of the disclosure provide techniques for linking individual biometric data to applications on user devices, and using such linked biometric data during authentication to determine the outcome of an authentication transaction. An exemplary computer-implemented method includes obtaining multiple sets of biometric data associated with multiple users of at least one user device and identifying information pertaining to the multiple sets of biometric data, and outputting at least a portion of the identifying information pertaining to the multiple sets of biometric data and identifying information pertaining to one or more protected resources via one or more interfaces of the at least one user device. The method also includes linking at least a portion of the multiple sets of biometric data to at least one of the one or more protected resources based at least in part on input from at least a first of the multiple users in response to the outputting step. Additionally, the method includes processing, in response to an authentication request in connection with an attempt to access the at least one protected resource by the at least first user, biometric data input to the at least one user device, and resolving the authentication request in response to a determination that the biometric data input to the at least one user device match at least a portion of the biometric data linked to the at least one protected resource.

Illustrative embodiments can provide significant advantages relative to conventional user device authentication approaches. For example, device performance problems associated with executing multiple user profiles across multiple applications are overcome in one or more embodiments through linking biometric data of individual users of a user device to particular protected resources accessed via any user device.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
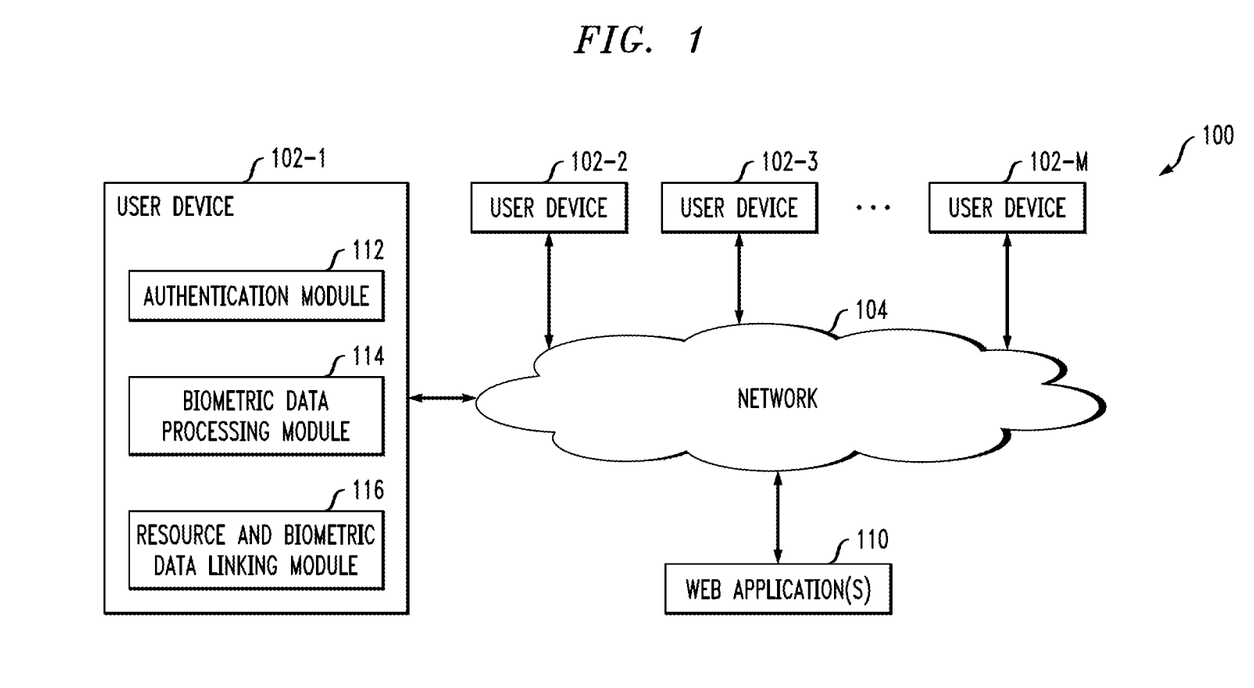
FIG. 1 shows an information processing system configured for linking individual biometric data to applications on user devices in an illustrative embodiment.

FIG. 1 shows a computer network (also referred to herein as an information processing system) 100 configured in accordance with an illustrative embodiment. The computer network 100 comprises a plurality of user devices 102-1, 102-2, 102-3, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is web application(s) 110, which can include, for example, authentication applications, applications containing and/or representing protected resources, etc.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. An operation described herein as being performed by a user may therefore, for example, be performed by a user device, a person utilizing or otherwise associated with the device, or by a combination of both the person and the device. Similarly, biometric data or other cryptographic information described as being associated with a user may, for example, be associated with a user device 102, a person utilizing or otherwise associated with the device, or a combination of both the person and the device.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Figure 2:
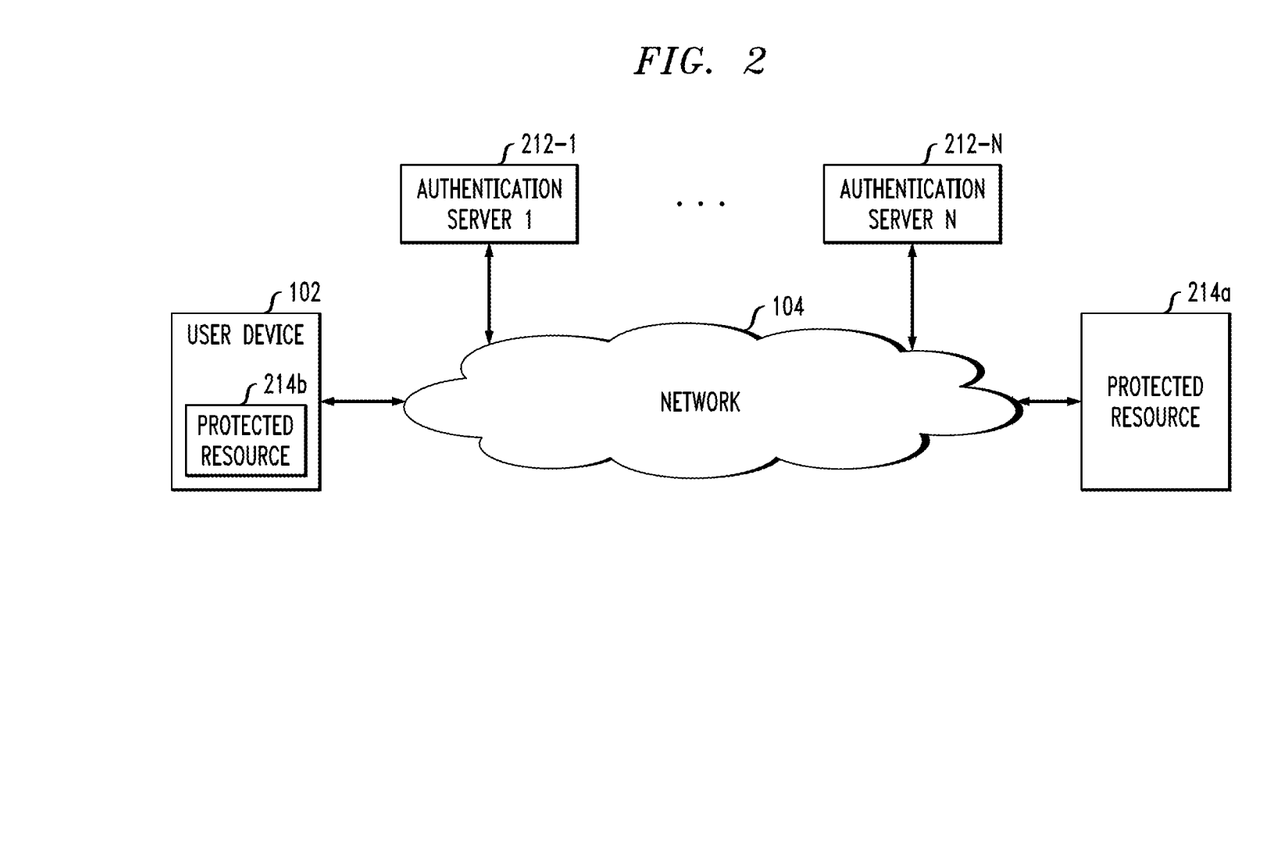
FIG. 2 shows another information processing system configured for linking individual biometric data to applications on user devices in an illustrative embodiment.

Additionally, one or more of the user devices 102 (as well as authentication servers 212, as depicted in FIG. 2) can have an associated database configured to store data pertaining to cryptographic information associated with authentication events, which comprise, for example, authentication data or other types of login data including biometric data, passwords and/or other information associated with authentication operations.

Such a database can be implemented using one or more storage systems associated with user devices 102 (and/or authentication servers 212). Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the user devices 102 can be input-output devices, which illustratively comprise keyboards, displays or other types of input-output devices in any combination. Such input-output devices can be used, for example, to support one or more user interfaces to user devices 102, as well as to support communication between user devices 102 and other related systems and devices not explicitly shown.

Each user device 102 in the FIG. 1 embodiment is assumed to be implemented using at least one processing device. Each such processing device generally comprises at least one processor and an associated memory, and implements one or more functional modules for controlling certain features of the user device 102.

More particularly, user devices 102 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the user devices 102 to communicate over the network 104 with one or more other devices, and illustratively comprises one or more conventional transceivers.

Each user device 102 depicted in the example FIG. 1 embodiment further comprises an authentication module 112, a biometric data processing module 114, and a resource and biometric data linking module 116.

By way of illustration, in at least one embodiment, authentication attempts initiated at respective ones of the user devices 102 are processed using at least the authentication module 112. The authentication module 112 determines if a given access attempt is authentic based on presentation of one or more predetermined authentication factors such as particular individual biometric data (as further detailed herein). Upon verification of the presented authentication factors, the authentication module 112 grants the requesting user device 102 access to one or more protected resources of the computer network 100. Although shown as an element of user device 102 in this embodiment, the authentication module 112 in other embodiments can be implemented at least in part externally to user device 102, for example, as a stand-alone authentication server, set of servers or other type of authentication system coupled to the network 104 (such as depicted in FIG. 2 via authentication servers 212, for example).

Accordingly, it is to be appreciated that this particular arrangement of modules 112, 114 and 116 illustrated in user devices 102 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for linking of biometric data to protected resources involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example user device 102 in computer network 100 will be described in more detail with reference to the flow diagram of FIG. 6.

FIG. 2 is a system diagram of an illustrative embodiment. By way of illustration, FIG. 2 depicts an alternative embodiment to FIG. 1, wherein the authentication server(s) 212 is/are not resident on the user devices 102, but rather are separate devices. Accordingly, as depicted in FIG. 2, a user device 102 communicates with a protected resource 214*a* over network 104. As detailed further below, at least one embodiment can also include user device 102 that includes protected resources 214*b* residing thereon. In an example implementation, a user authenticates online with one or more authentication servers 212-1 through 212-N (hereinafter, collectively referred to as authentication servers 212) before obtaining access to protected resource 214*a* and/or 214*b* (hereinafter, collectively referred to as protected resource 214 unless otherwise specified).

According to at least one embodiment, as noted above, the user of a user device 102 is authenticated by authentication servers 212 using one or more forms of cryptographic information, such as biometric data. The exemplary communications among the system elements 102, 104 and 214 of FIG. 2 to achieve authentication by the authentication servers 212 are discussed further below.

It is to be appreciated that a given embodiment of the disclosed system includes multiple instances of user device 102 and protected resource 214, and possibly other system components, although limited instances of such components are shown in the simplified system diagram of FIG. 2 for clarity of illustration.

As noted herein, user device 102 may represent a portable device, such as a mobile telephone, personal digital assistant (PDA), wireless email device, game console, etc. User device 102 may alternatively represent a desktop or laptop personal computer (PC), a microcomputer, a workstation, a mainframe computer, a wired telephone, a television set top box, or any other information processing device which can benefit from the use of authentication techniques in accordance with one or more embodiments.

As also depicted in FIG. 2, the authentication servers 212 can be associated with a third-party entity, such as an authentication authority, that processes authentication requests on behalf of web servers and other resources, as well as verifies the cryptographic information that is presented by a user device 102.

Further, the protected resource 214 may be, for example, an access-controlled application, web site or hardware device. In other words, a protected resource 214 is a resource that grants user access responsive to an authentication process, as will be described in greater detail below. For example, protected resource 214*a* can include an access-controlled file, e-mail, a protected application, a remote application server such as a web site or other software program or hardware device that is accessed by the user device 102 over a network 104.

Additionally, in at least one embodiment, protected resource 214*b* can include one or more applications or data residing on the user device 102 itself. For example, such a protected resource 214*b* can include access to a mobile data management container for launching applications on the user device 102 (such as a mobile device), which can be protected by requiring authentication in order to run the application(s) protected by the container. Further, protected resource 214*b* could also include an access-controlled file, e-mail, a protected application, a remote application server such as a web site or other software program or hardware device that is accessed by the user device 102 over network 104. Similarly, it is possible that in order to unlock the mobile platform to perform operations, a successful authentication might be required.

Accordingly, at least one embodiment includes generating and/or implementing a mechanism or a system which enables secure and restricted access to protected resources by linking individual biometric data to various applications. In such an embodiment, each registered and/or stored set of individual biometric data (fingerprint data, facial image data, etc.) on the user device is assigned a unique identifier (ID). A native user device application can prompt the user to select one or more portions of biometric data for which the authentications should be considered for that application. The biometric authentication application programming interface (API; provided, for example, by the device operating system (OS)), upon successful authentication, will return the unique ID associated with the biometric data that were matched. Additionally, after the biometric authentication, the native user device application will decide whether to proceed further based on the unique ID that was returned from the biometric authentication API. Also, in such an embodiment, the application already has the details of the biometric data with which it should work.

In one or more embodiments, a cloud-based authentication provider (AUTH_PROVIDER) requires end-users to install a native user device application (AUTH_APP) and register the application with it (i.e., with AUTH_PROVIDER). Additionally, by way merely of illustration, consider an example use case that includes two end-users, Alice and Bob, and a smart mobile device (DEVICE1) that is shared between Alice and Bob. DEVICE1 has capabilities to perform fingerprint and facial recognition authentication. Both Bob and Alice have stored their fingerprints and faceprints in DEVICE1, and as a result, both can successfully authenticate either via fingerprint or face recognition authentication methods. During the process of adding their biometric data to DEVICE1, Alice and Bob can provide and/or assign at least one name to their respective biometric prints. For example, the names of the biometric data of Bob can include BOB_FIN (fingerprint data) and BOB_FACE (face print data), while the names of the biometric data of Alice can include ALICE_FIN (fingerprint data) and ALICE_FACE (face print data). Additionally, in such an example use case and embodiment, each such set of biometric data has a unique ID associated therewith. By way of example and for the purpose of explanation, let such IDs be as follows: BOB_FIN=UUID1; BOB_FACE=UUID2; ALICE_FIN=UUID3; and ALICE_FACE=UUID4.

In such an example use case, Bob has registered DEVICE1 with AUTH_PROVIDER, and Bob has installed an authenticator application (AUTH_APP), provided by the AUTH_PROVIDER, on the shared device as part of this registration. It is also noted that Bob is part of an organization wherein resources are protected with AUTH_PROVIDER, and to access each protected resource, Bob needs to complete an authentication (determined by the AUTH_PROVIDER) on the mobile device (DEVICE1) which he also shares with Alice. The authentication methods include, but are not limited to, fingerprint authentication, face ID authentication, push to approve authentication, etc.

Further, in such an illustrative use case, protected resources can include, by way merely of example, a network (e.g., a virtual private network (VPN)), sensitive data, etc. Also, in one or more such embodiments, biometric data can include fingerprints, iris scans, voice patterns, face and/or ear photos, facial recognition data, etc.

By way of further illustration, consider a use case wherein end-user Bob installs the AUTH_APP and registers DEVICE1 with AUTH_PROVIDER. Bob initiates the device registration with AUTH_PROVIDER through AUTH_APP by providing the necessary information (e.g., name, email, password, etc.). Assuming that the information provided is accurate, DEVICE1 is registered in AUTH_PROVIDER for the end-user Bob, and the AUTH_APP detects DEVICE1's capabilities and identifies that the device can perform fingerprint and facial recognition authentication.

The AUTH_APP obtains a list of registered and/or stored fingerprint and faceprint data from DEVICE1 and displays such data to the user. In one or more embodiments, AUTH_APP only receives the user-provided names that were given to the stored fingerprints and/or faceprints. In this example use case, the list will include BOB_FIN, BOB_FACE, ALICE_FIN, and ALICE_FACE. Bob will select BOB_FIN and BOB_FACE, and link such data to the AUTH_APP. Accordingly, such a selection indicates to the AUTH_APP that it should only accept biometric authentications done using either BOB_FIN or BOB_FACE. The AUTH_APP then obtains the unique IDs of these biometric prints (UUID1 and UUID2) and stores this information securely so that the information can be used in future authentication operations.

Now consider a runtime use case example wherein Bob is attempted to access a resource (e.g., a Wiki page) which is protected by AUTH_PROVIDER and which requires him to perform biometric authentication on DEVICE1 to gain access to the protected resource. In such a use case, Bob attempts to access the protected resource through a web browser using DEVICE1 (though it should be noted that Bob can access the Wiki page resource from any device via a web browser, including DEVICE1). The AUTH_PROVIDER determines (through access and authentication policies) that for Bob to obtain access to the protected resource, he must perform a biometric authentication on his registered device. AUTH_PROVIDER sends a notification to DEVICE1 (using, for example, a mobile notification service). AUTH_APP, on DEVICE1, will prompt for a biometric authentication. Bob can then perform either fingerprint or face recognition authentication. In this example use case, assume that Bob opted for a fingerprint authentication.

Post-authentication, the biometric authentication API of the device OS will return the unique ID of the biometric print that was matched during authentication in addition to one or more other details. In this case, the returned ID will be UUID1. Additionally, AUTH_APP sees that the authentication succeeded and the biometric print that was matched has a unique ID of UUID1. As a result of biometric data linking during or after device registration, the AUTH_APP knows that it should only consider biometric authentications for prints having unique ID of UUID1 or UUID2, and because UUID1 was returned from the biometric authentication API, AUTH_APP considers this authentication transaction as a success and Bob is granted access to the protected resource.

Also, consider a similar use case example to the one above, but wherein DEVICE1 is in the possession of Alice. In such a use case, Bob attempts to access the protected resource (e.g., a Wiki page) through a web browser. The AUTH_PROVIDER determines (through access and authentication policies) that for Bob to receive access to the protected resource, he must perform a biometric authentication on his registered device (DEVICE1). Accordingly, AUTH_PROVIDER sends a notification to DEVICE1, and AUTH_APP, on DEVICE1, prompts for a biometric authentication. However, in this use case example, as noted, Alice is in possession of DEVICE1. She sees this notification to perform biometric authentication and attempts to perform a fingerprint authentication. The biometric authentication API returns an indication that the authentication succeeded and that the unique ID of the print that matched is UUID3. However, AUTH_APP considers this a failed authentication, as UUID3 is not associated with the specific authentication operation (i.e., Bob's authentication to access the protected resource), and Bob is denied access to the protected resource. That is, AUTH_APP is linked with only UUID1 and UUID2. Hence, once AUTH_APP sees that UUID3 was the UUID of authenticated biometric data, AUTH_APP considers it a failed authentication, as UUID3 is not linked to AUTH_APP.

Figure 3:
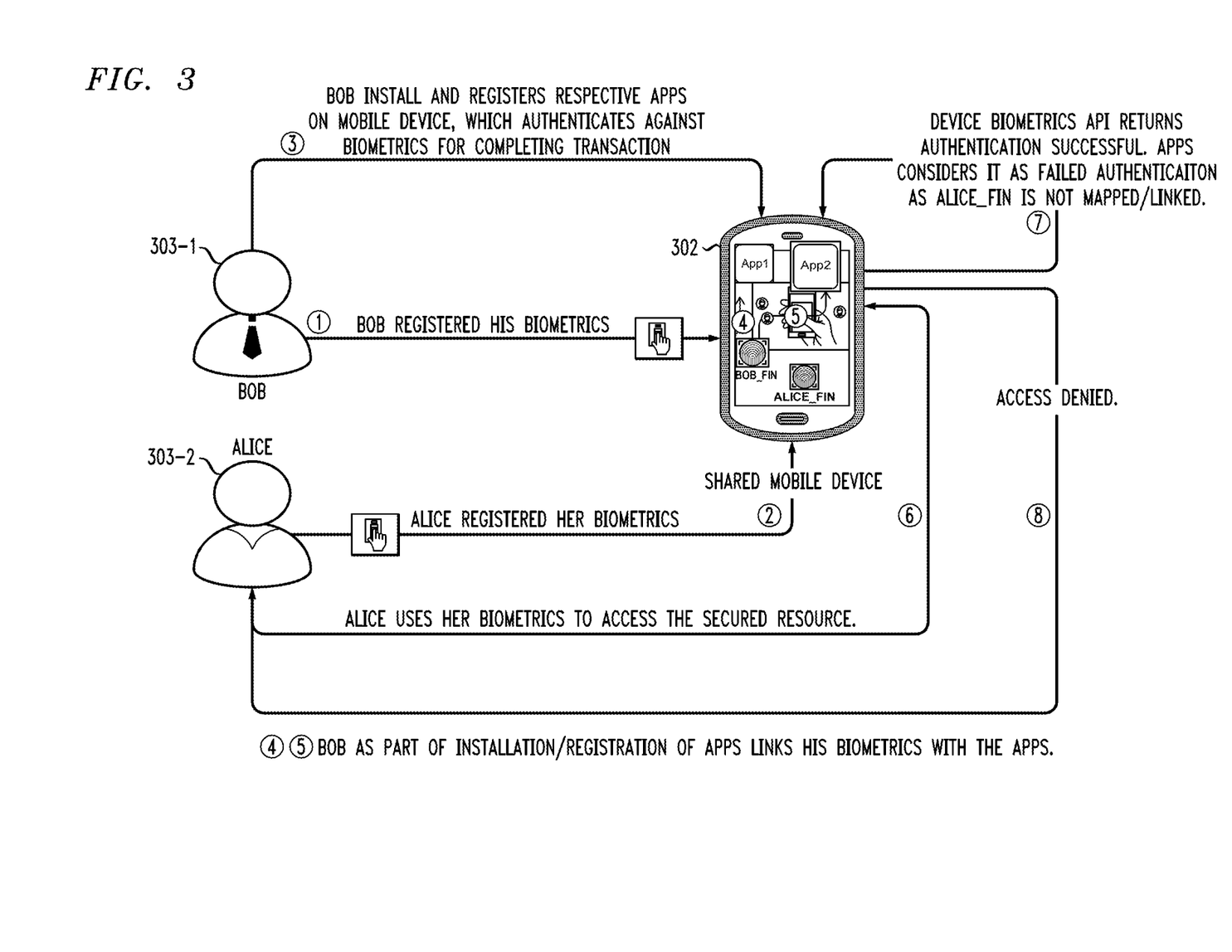
FIG. 3 shows an example local authentication use case in accordance with an illustrative embodiment.
Figure 4:
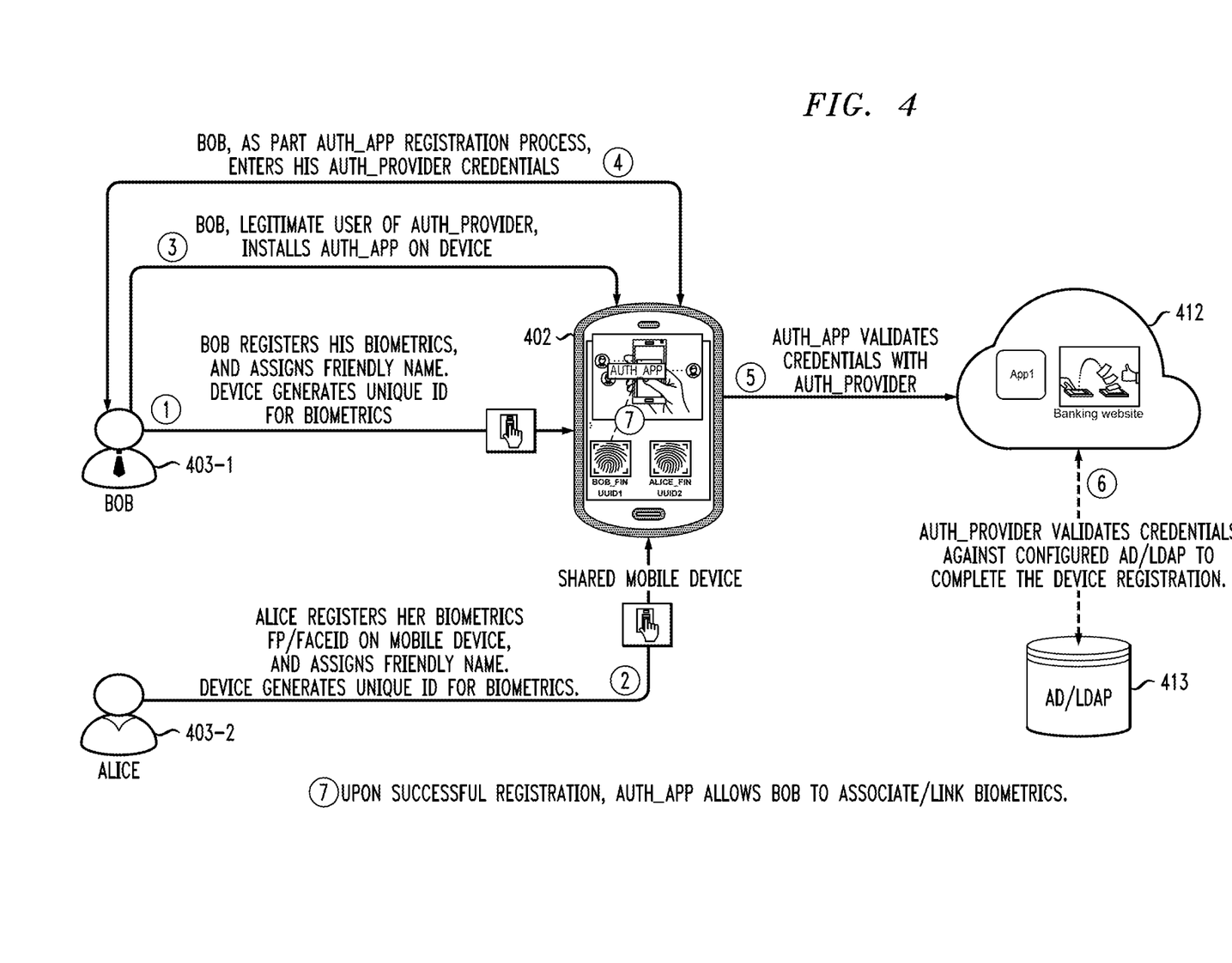
FIG. 4 shows an example device registration workflow in a third-party authentication service provider use case, in accordance with an illustrative embodiment.
Figure 5:
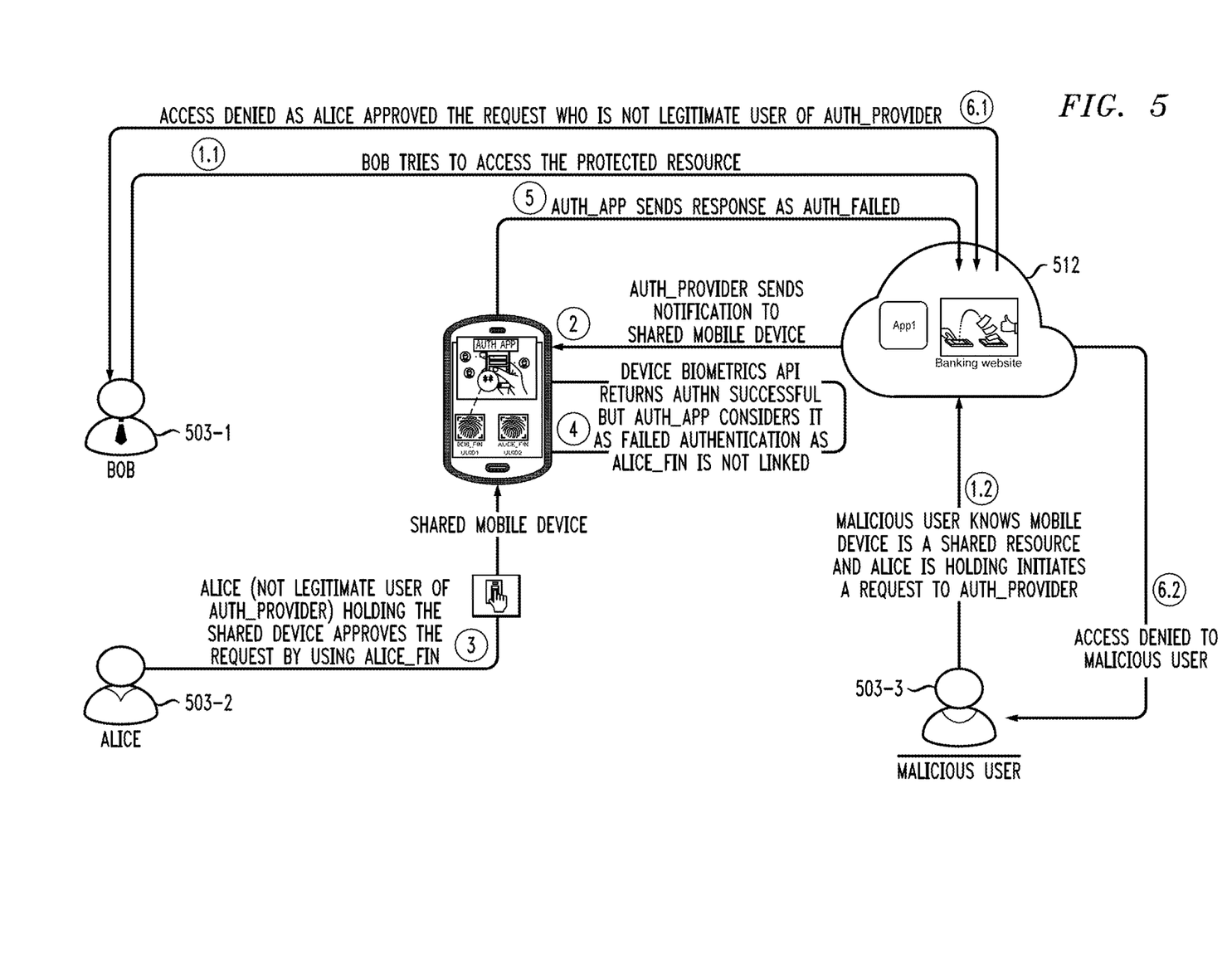
FIG. 5 shows an example third-party authentication service provider use case in accordance with an illustrative embodiment.

In addition to the use cases involving a cloud based security provider such as AUTH_PROVIDER (for example, as also depicted in FIG. 4 and FIG. 5), one or more embodiments include application to scenarios wherein only native user device applications (wallets, bank apps, etc.) are involved (such as, for example, the embodiment depicted in FIG. 3).

FIG. 3 shows an example local authentication use case in accordance with an illustrative embodiment. By way of illustration, step 1 depicts Bob 303-1 registering his biometric data on mobile device 302, and step 2 depicts Alice 303-2 registering her biometric data on the mobile device 302. Step 3 depicts Bob 303-1 (a legitimate user of application1 and application2) installing the respective applications on mobile device 302, which authenticates against device biometrics for completing transactions. As also noted in FIG. 3, steps 4 and 5 include Bob 303-1, as part of the installation and registration of the applications, linking at least a portion of his biometric data with the applications.

In step 6, Alice 303-2, not a legitimate user of Application1 or Application2, uses her biometric data to attempt to access a secured and/or protected resource which is part of Application1 and/or Application2. In step 7, the device biometrics authentication API of the mobile device 302 returns an indication that Alice's fingerprint authentication succeeded, and also identifies UUID3 in response. However, UUID3 is not linked to Application1 or Application2, and as such, the applications deny access to Alice 303-2. Accordingly, step 8 includes the mobile device 302 providing an indication to Alice 303-2 that her attempted resource access is denied.

FIG. 4 shows an example device registration workflow in a third-party authentication service provider use case, in accordance with an illustrative embodiment. By way of illustration, step 1 depicts Bob 403-1 registering his biometric data on mobile device 402, and assigning a name of his choosing to the biometric data, while the mobile device 402 generates a unique ID for the same biometric data. In step 2, Alice 403-2 registers her biometric data on the mobile device 402 and assigns a name of her choosing to the biometric data, while the mobile device 402 generates a unique ID for the same biometric data. In step 3, Bob 403-1, a legitimate user of AUTH_PROVIDER, installs the AUTH_APP on the mobile device 402. Also, in step 4, as part of the registration of the application (AUTH_APP) with the authentication service provider (AUTH_PROVIDER), Bob 403-1 enters his credentials associated with the authentication service provider into the mobile device 402. In step 5, the authentication service provider validates Bob's credentials with a cloud-based authentication server 412, which validates the credentials in step 6 against a configured active directory/lightweight directory access protocol (AD/LDAP) 413 to complete the device registration. It is to be appreciated that device registration using AD/LDAP credentials is just one way of authentication, and the AUTH_PROVIDER can use one or more other forms of authentication during device registrations. Further, in step 7, upon a successful registration, the authentication service provider permits Bob 403-1 to link at least a portion of his registered biometric data with the application (AUTH_APP).

FIG. 5 shows an example third-party authentication service provider (AUTH_PROVIDER) use case in accordance with an illustrative embodiment. By way of illustration, step 1.1 of FIG. 5 depicts Bob 503-1 attempting to access a protected resource. In an alternate yet possible scenario, depicted herein as step 1.2, a malicious user 503-3, who knows that mobile device 502 is shared among multiple people and that Alice 503-2 is currently in possession of the device 502, initiates a request to the cloud-based authentication server 512. Step 2 depicts a cloud-based authentication server 512 sending a notification to mobile device 502 pertaining to Bob's access attempt. Also, it is noted that as part of Bob's registration of an authentication service application with the cloud-based authentication server 512, Bob 503-1 links at least a portion of his biometric data, stored on the mobile device 502, with the application.

Step 3 depicts Alice 503-2, not a legitimate user of the authentication service application, being in possession of mobile device 502 and approving the request for authentication sent through the mobile device 502 from the authentication service application using her own biometric data. Subsequently, in step 4, the device biometrics API returns an indication of a successful authentication (because Alice's biometric data is registered on the device 502), but the authentication service application deems the authentication as failed because Alice's biometric data is not linked to the application. Accordingly, in step 5, the authentication service application sends an indication to the cloud-based authentication server 512 that the authentication has failed. In step 6.1, access is denied in connection with Bob's attempt, as Alice's biometric data (that is, the biometric data entered in connection with the authentication request) are not linked with the authentication service application. Similarly, in the alternate yet possible scenario involving malicious user 503-3, step 6.2 depicts denying access to the malicious user 503-3.

Additionally or alternatively, one or more embodiments include facilitating and/or enabling a user to change (e.g., add or remove) an association of linked biometric data with one or more applications. Consider, for example, a scenario wherein Bob has already associated BOB_FIN and BOB_FACE with AUTH_APP, and Bob now stores one more sets of fingerprint data (e.g., fingerprint data associated with his left thumb finger) in DEVICE1, the data (BOB_FIN_2) having a unique ID of UUID5. Bob also wishes to link this newly-stored BOB_FIN_2 with AUTH_APP. Accordingly, Bob opens AUTH_APP, navigates to the biometric settings option provided by AUTH_APP, and selects an option to link a new biometric print. AUTH_APP prompts for an authentication, and this authentication can be a locally decided authentication wherein the AUTH_APP itself triggers the authentication, or the authentication can be driven by the policies present in and enforced by AUTH_PROVIDER.

In a case wherein AUTH_APP itself triggers a local biometric authentication, the authentication should be carried out with one of the pre-linked prints with AUTH_APP for the authentication to be considered successful such that Bob can proceed further. Accordingly, Bob performs, for example, a facial recognition authentication, and the device OS authentication API returns the UUID of the matched biometric print (which, for Bob's face print, will be UUID2).

AUTH_APP observes that UUID2 is already linked therewith and considers the operation a successful authentication.

Bob is now shown the list of biometric prints stored in the device, he is able to select the newly-stored BOB_FIN_2, and AUTH_APP stores the unique ID of the print (UUID5), thereby linking to the additional biometric data. If Bob cannot complete a successful authentication, he cannot link and/or unlink biometric prints with AUTH_APP.

Additionally or alternatively, in a case wherein no biometric prints are stored in DEVICE1, then at the time of linking, the user is asked to store at least one biometric print in the device to proceed further.

Further, at least one embodiment includes synchronizing the user-provided names of biometric data and the associated UUIDs with the AUTH_PROVIDER. The end-user can, for example, view in a self-service console (or equivalent component) one or more such details and, for instance, identify of any discrepancies.

Also, at least one embodiment includes assuming the availability of certain enhancements and/or additions in the user device operating system (e.g., particularly those pertaining to biometric authentication and storage of biometric prints.) For example, each item of biometric data stored in the user device has a globally unique ID associated therewith. Various approaches can be considered to generate such an ID (e.g., hashing). However, the unique ID itself should not reveal anything substantive about the corresponding biometric data, and the user should be allowed to assign a name to the biometric data that he or she stores in the device. The biometric authentication API can then return the unique ID of the biometric data that was matched, during authentication, to the invoking application (for example, AUTH_APP). Additionally, in one or more embodiments, an API is provided to fetch the unique IDs and user-provided names of all of the stored biometric data.

Figure 6:
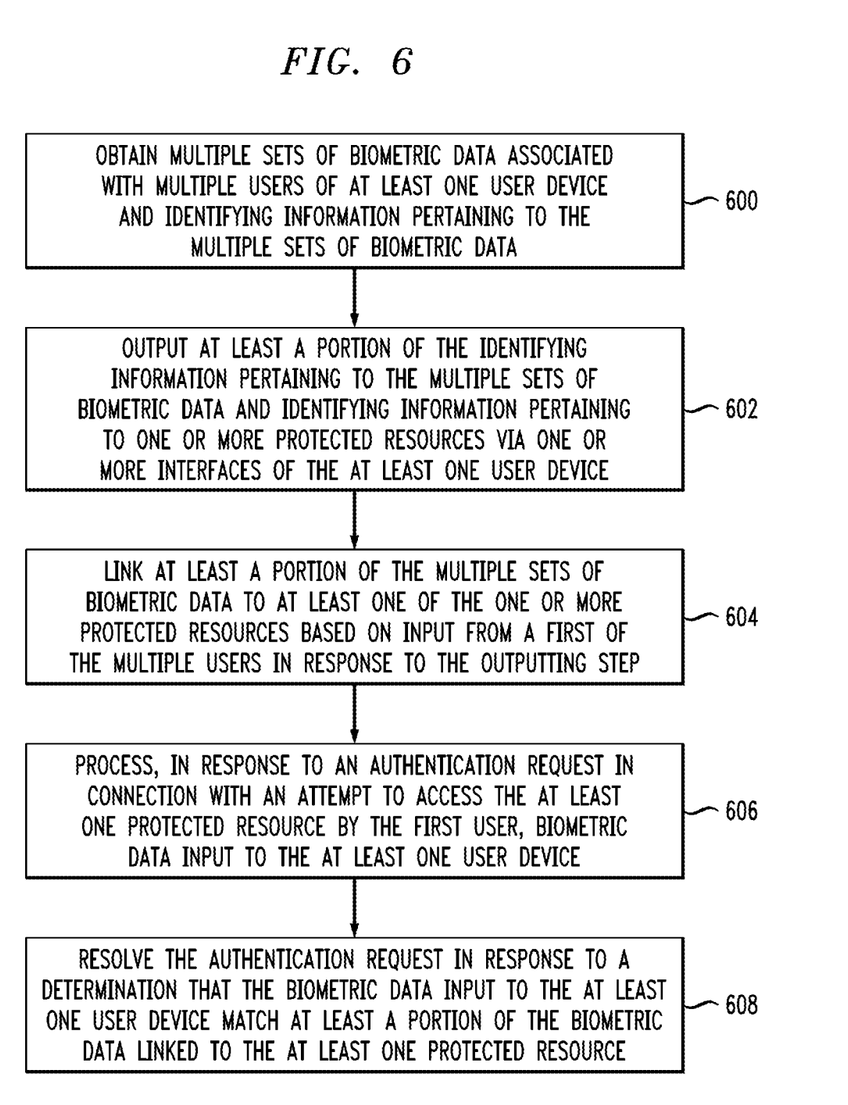
FIG. 6 is a flow diagram of a process for linking individual biometric data to applications on user devices in an illustrative embodiment.

FIG. 6 is a flow diagram of a process for linking individual biometric data to applications on user devices in an illustrative embodiment. It is to be understood that this particular process is only an example, and additional or alternative processes can be carried out in other embodiments.

In an example embodiment, the process includes steps 600 through 608. These steps are assumed to be performed at least in part by user device 102 utilizing its modules 112, 114 and 116.

Step 600 includes obtaining multiple sets of biometric data associated with multiple users of at least one user device and identifying information pertaining to the multiple sets of biometric data. In at least one embodiment, the identifying information pertaining to the multiple sets of biometric data includes user-provided names associated with the multiple sets of biometric data. Additionally or alternatively, in at least one embodiment, the multiple sets of biometric data (e.g., fingerprint data, iris scan data, voice pattern data, facial image data, facial recognition data, etc.) associated with the multiple users of the at least one user device are stored on the at least one user device.

Step 602 includes outputting at least a portion of the identifying information pertaining to the multiple sets of biometric data and identifying information pertaining to one or more protected resources via one or more interfaces of the at least one user device. Step 604 includes linking at least a portion of the multiple sets of biometric data to at least one of the one or more protected resources based at least in part on input from at least a first of the multiple users in response to the outputting step.

Step 606 includes processing, in response to an authentication request in connection with an attempt to access the at least one protected resource by the at least first user, biometric data input to the at least one user device. Step 608 includes resolving the authentication request in response to a determination that the biometric data input to the at least one user device match at least a portion of the biometric data linked to the at least one protected resource.

The techniques depicted in FIG. 6 can also include obtaining one or more unique identifiers assigned to the biometric data linked to the at least one protected resource (e.g., by generating the one or more unique identifiers using at least one hashing technique). In one or more embodiments, resolving the authentication request includes determining a unique identifier assigned to the biometric data input to the at least one user device, and comparing the unique identifier assigned to the biometric data input to the at least one user device to each unique identifier assigned to the biometric data linked to the at least one protected resource.

Also, the techniques depicted in FIG. 6 can be carried out, for example, by the at least one user device and/or by at least one remote authentication server. Further, one or more embodiments can include modifying the linking of the at least a portion of the multiple sets of biometric data to the at least one of the one or more protected resources based at least in part on additional input from the at least first of the multiple users.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to link biometric data of individual users of a user device to particular protected resources accessed via the user device. These and other embodiments can effectively overcome problems associated with executing multiple user profiles across multiple applications in a user device. Even in the absence of multiple profiles on a shared device, one or more embodiments provide a significant advantage by offering more granularity to the user in securing access to protected resources.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
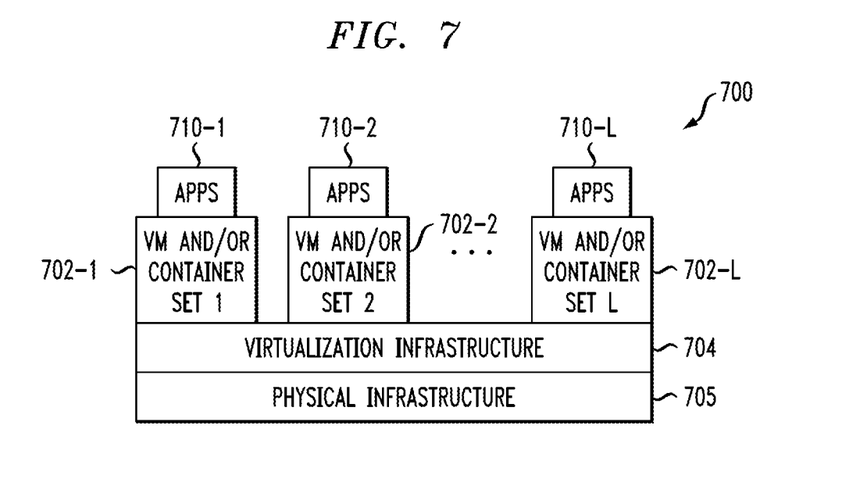
FIGS. 7 and 8 show examples of processing platforms that may be utilized to implement at least a portion of an information processing system in illustrative embodiments.
Figure 8:
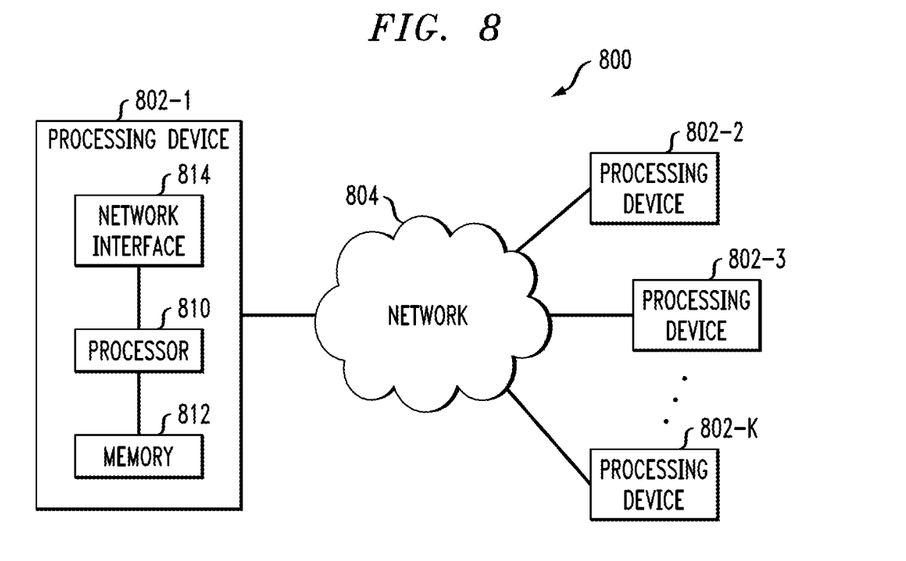

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, ... 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, cloud-based systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining multiple sets of biometric data associated with multiple users of a user device and identifying information pertaining to the multiple sets of biometric data, wherein the identifying information pertaining to the multiple sets of biometric data comprises user-provided identifiers associated with the multiple sets of biometric data;

outputting at least a portion of the identifying information pertaining to the multiple sets of biometric data and identifying information pertaining to one or more protected resources via one or more interfaces of the user device;

linking at least a first portion of the multiple sets of biometric data to at least a first subset of the one or more protected resources based at least in part on input from at least a first of the multiple users in response to at least a first instance of the outputting step, wherein the input from the at least first user comprises user selection of a first subset of the multiple sets of biometric data eligible for use with authentication requests submitted by the at least first user;

generating one or more hash-based identifiers, assigned to the biometric data linked to the at least first subset of the one or more protected resources, using at least one hashing technique;

linking at least a second portion of the multiple sets of biometric data, different from the at least first portion of the multiple sets of biometric data, to at least a second subset of the one or more protected resources, different from the at least first subset of the one or more protected resources, based at least in part on input from at least a second of the multiple users, different from the at least first user, in response to at least a second instance of the outputting step, wherein the input from the at least second user comprises user selection of a second subset of the multiple sets of biometric data, different from the first subset of the multiple sets of biometric data, eligible for use with authentication requests submitted by the at least second user;

processing, in response to an authentication request in connection with an attempt to access at least a portion of the at least first subset of the one or more protected resources by the at least first user, biometric data input to the user device; and resolving the authentication request in response to a determination that at least a portion of the biometric data input to the user device matches at least a portion of the biometric data linked to the at least first subset of the one or more protected resources and corresponds exclusively to the at least first user submitting the authentication request, based at least in part on a comparison of at least one hash-based identifier assigned to the biometric data input to the one or more hash-based identifiers assigned to the biometric data linked to the at least first subset of the one or more protected resources;

wherein the method is performed by at least one processing device comprising a processor coupled to a memory.

2. The computer-implemented method of claim 1, wherein resolving the authentication request comprises determining the at least one hash-based identifier assigned to the biometric data input to the user device.

3. The computer-implemented method of claim 1, wherein the multiple sets of biometric data associated with the multiple users of the user device are stored on the user device.

4. The computer-implemented method of claim 1, wherein the multiple sets of biometric data comprise one or more of fingerprint data, iris scan data, voice pattern data, facial image data, and facial recognition data.

5. The computer-implemented method of claim 1, wherein the at least one processing device comprising a processor coupled to a memory comprises the user device.

6. The computer-implemented method of claim 1, wherein the at least one processing device comprising a processor coupled to a memory comprises at least one remote authentication server.

7. The computer-implemented method of claim 1, further comprising:

modifying the linking of the at least a first portion of the multiple sets of biometric data to the at least first subset of the one or more protected resources based at least in part on additional input from the at least first user.

8. A non-transitory processor-readable storage medium having stored therein program code of one or more software programs, wherein the program code when executed by at least one processing device causes the at least one processing device:

to obtain multiple sets of biometric data associated with multiple users of a user device and identifying information pertaining to the multiple sets of biometric data, wherein the identifying information pertaining to the multiple sets of biometric data comprises user-provided identifiers associated with the multiple sets of biometric data;

to output at least a portion of the identifying information pertaining to the multiple sets of biometric data and identifying information pertaining to one or more protected resources via one or more interfaces of the user device;

to link at least a first portion of the multiple sets of biometric data to at least a first subset of the one or more protected resources based at least in part on input from at least a first of the multiple users in response to at least a first instance of the outputting step, wherein the input from the at least first user comprises user selection of a first subset of the multiple sets of biometric data eligible for use with authentication requests submitted by the at least first user;

to generate one or more hash-based identifiers, assigned to the biometric data linked to the at least first subset of the one or more protected resources, using at least one hashing technique;

to link at least a second portion of the multiple sets of biometric data, different from the at least first portion of the multiple sets of biometric data, to at least a second subset of the one or more protected resources, different from the at least first subset of the one or more protected resources, based at least in part on input from at least a second of the multiple users, different from the at least first user, in response to at least a second instance of the outputting step, wherein the input from the at least second user comprises user selection of a second subset of the multiple sets of biometric data, different from the first subset of the multiple sets of biometric data, eligible for use with authentication requests submitted by the at least second user;

to process, in response to an authentication request in connection with an attempt to access at least a portion of the at least first subset of the one or more protected resources by the at least first user, biometric data input to the user device; and to resolve the authentication request in response to a determination that at least a portion of the biometric data input to the user device matches at least a portion of the biometric data linked to the at least first subset of the one or more protected resources and corresponds exclusively to the at least first user submitting the authentication request, based at least in part on a comparison of at least one hash-based identifier assigned to the biometric data input to the one or more hash-based identifiers assigned to the biometric data linked to the at least first subset of the one or more protected resources.

9. The non-transitory processor-readable storage medium of claim 8, wherein resolving the authentication request comprises determining the at least one hash-based identifier assigned to the biometric data input to the user device.

10. The non-transitory processor-readable storage medium of claim 8, wherein the multiple sets of biometric data associated with the multiple users of the user device are stored on the user device.

11. An apparatus comprising:
  at least one processing device comprising a processor coupled to a memory;
  the at least one processing device being configured:
    to obtain multiple sets of biometric data associated with multiple users of a user device and identifying information pertaining to the multiple sets of biometric data, wherein the identifying information pertaining to the multiple sets of biometric data comprises user-provided identifiers associated with the multiple sets of biometric data;
    to output at least a portion of the identifying information pertaining to the multiple sets of biometric data and identifying information pertaining to one or more protected resources via one or more interfaces of the user device;
    to link at least a first portion of the multiple sets of biometric data to at least a first subset of the one or more protected resources based at least in part on input from at least a first of the multiple users in response to at least a first instance of the outputting step, wherein the input from the at least first user comprises user selection of a first subset of the multiple sets of biometric data eligible for use with authentication requests submitted by the at least first user;
    to generate one or more hash-based identifiers, assigned to the biometric data linked to the at least first subset of the one or more protected resources, using at least one hashing technique;
    to link at least a second portion of the multiple sets of biometric data, different from the at least first portion of the multiple sets of biometric data, to at least a second subset of the one or more protected resources, different from the at least first subset of the one or more protected resources, based at least in part on input from at least a second of the multiple users, different from the at least first user, in response to at least a second instance of the outputting step, wherein the input from the at least second user comprises user selection of a second subset of the multiple sets of biometric data, different from the first subset of the multiple sets of biometric data, eligible for use with authentication requests submitted by the at least second user;
    to process, in response to an authentication request in connection with an attempt to access at least a portion of the at least first subset of the one or more protected resources by the at least first user, biometric data input to the user device; and
    to resolve the authentication request in response to a determination that at least a portion of the biometric data input to the user device matches at least a portion of the biometric data linked to the at least first subset of the one or more protected resources and corresponds exclusively to the at least first user submitting the authentication request, based at least in part on a comparison of at least one hash-based identifier assigned to the biometric data input to the one or more hash-based identifiers assigned to the biometric data linked to the at least first subset of the one or more protected resources.

12. The apparatus of claim 11, wherein resolving the authentication request comprises determining the at least one hash-based identifier assigned to the biometric data input to the user device.

13. The apparatus of claim 11, wherein the multiple sets of biometric data associated with the multiple users of the user device are stored on the user device.

14. The apparatus of claim 11, wherein the multiple sets of biometric data comprise one or more of fingerprint data, iris scan data, voice pattern data, facial image data, and facial recognition data.

15. The apparatus of claim 11, wherein the at least one processing device being further configured:
  to modify the linking of the at least a first portion of the multiple sets of biometric data to the at least first subset of the one or more protected resources based at least in part on additional input from the at least first user.

16. The apparatus of claim 11, wherein the at least one processing device comprises the user device.

17. The apparatus of claim 11, wherein the at least one processing device comprises at least one remote authentication server.

18. The non-transitory processor-readable storage medium of claim 8, wherein the multiple sets of biometric data comprise one or more of fingerprint data, iris scan data, voice pattern data, facial image data, and facial recognition data.

19. The non-transitory processor-readable storage medium of claim 8, wherein the program code when executed by the at least one processing device causes the at least one processing device:
  to modify the linking of the at least a first portion of the multiple sets of biometric data to the at least first subset of the one or more protected resources based at least in part on additional input from the at least first user.

20. The non-transitory processor-readable storage medium of claim 8, wherein the at least one processing device comprises the user device.

* * * * *

UNITED STATES PATENT AND TRADEMARK OFFICE
CERTIFICATE OF CORRECTION

| | |
|---|---|
| PATENT NO. | : 11,514,145 B2 |
| APPLICATION NO. | : 16/876313 |
| DATED | : November 29, 2022 |
| INVENTOR(S) | : Nagendra Gudibande Srikanta Sharma, Udayendranaidu Gottapu and Pedda Reddy Kathriki |

It is certified that error appears in the above-identified patent and that said Letters Patent is hereby corrected as shown below:

On the Title Page

In the Item (57) Abstract, Lines 6-9, replace:
"outputting the identifying information pertaining to the of biometric data and identifying information pertaining to protected resources"
With:
-- outputting the identifying information pertaining to the biometric data and identifying information pertaining to protected resources --

In the Item (57) Abstract, Lines 9-12, replace:
"linking at least a portion of the multiple sets of biometric data to one of the protected resources based on input from at least a first of the users in response to the outputting step"
With:
-- linking at least a portion of the biometric data to one of the protected resources based on input from at least a first of the users in response to the outputting step --

Signed and Sealed this
Twenty-third Day of January, 2024

*Katherine Kelly Vidal*

Katherine Kelly Vidal
*Director of the United States Patent and Trademark Office*